July 31, 1923.
C. R. DAVIS
1,463,613
POWER LIFT FOR GRAIN DRILLS
Filed Dec. 8, 1920
2 Sheets-Sheet 2
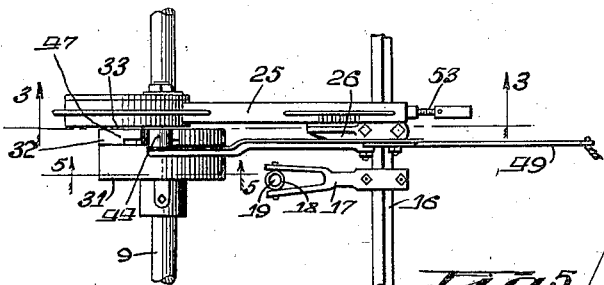
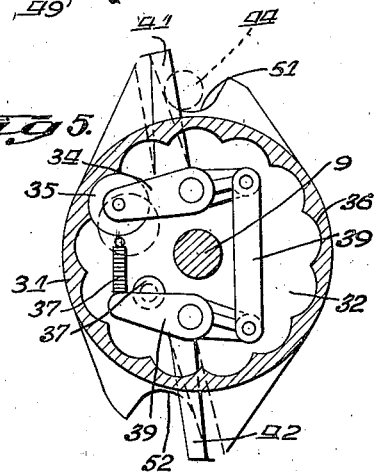
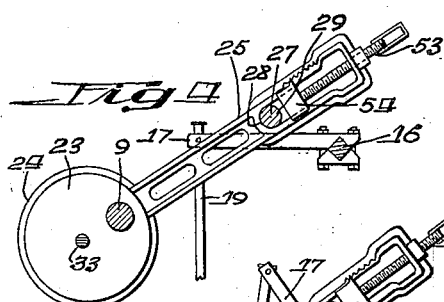
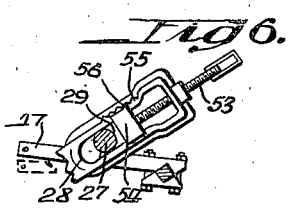
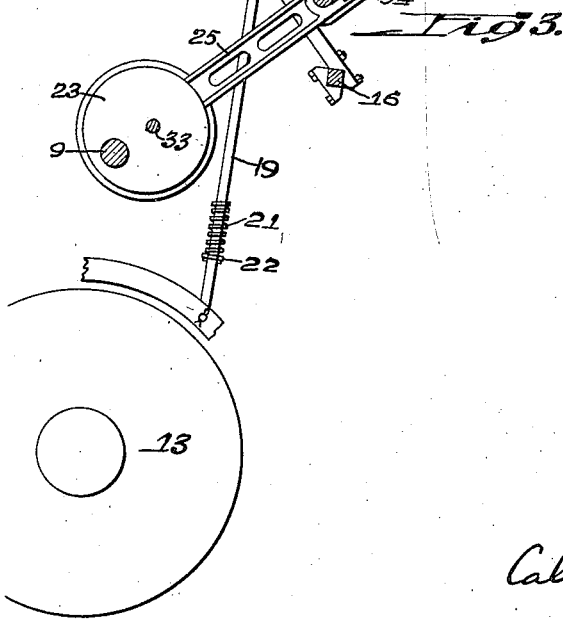
Inventor
Calvin R. Davis
By Ira J. Wilson.
Atty Patented July 31, 1923.

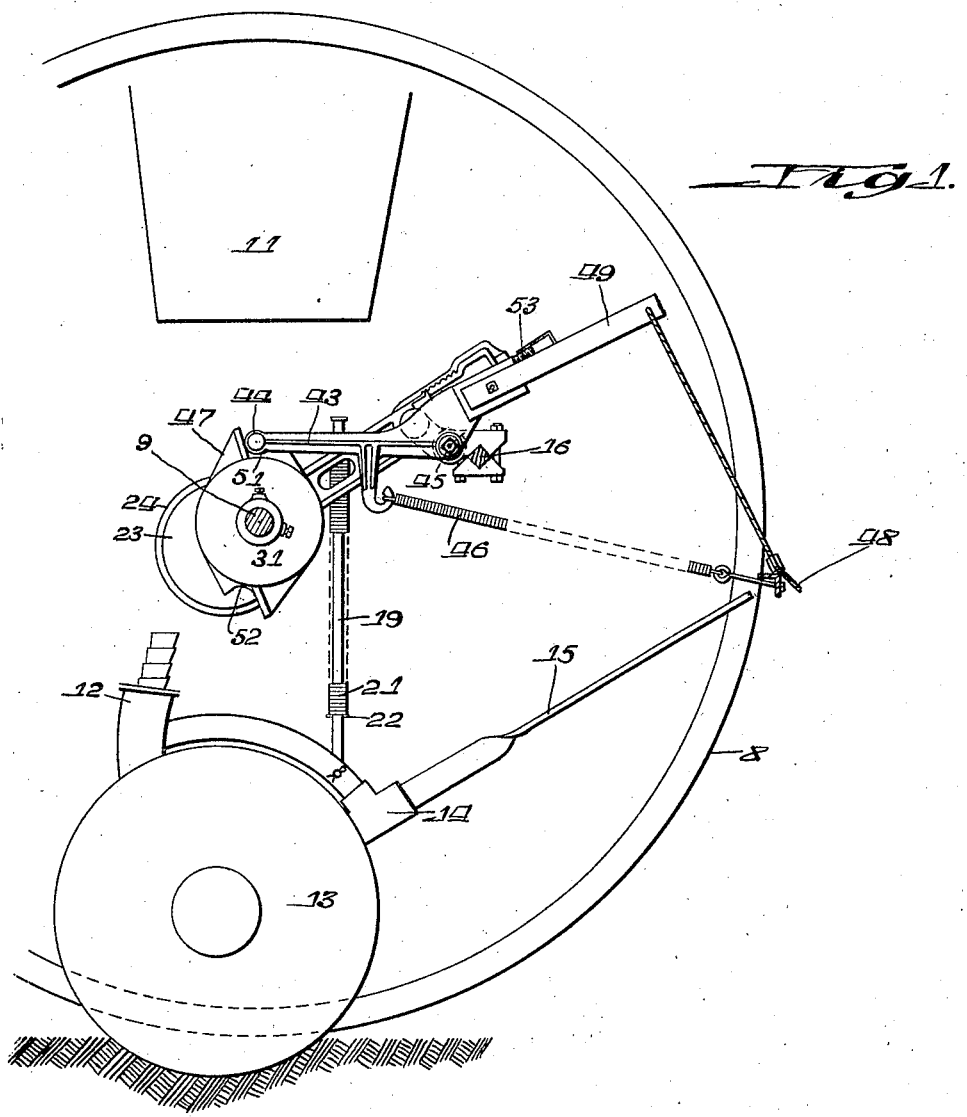

1,463,613

UNITED STATES PATENT OFFICE.

CALVIN R. DAVIS, OF ROCKFORD, ILLINOIS, ASSIGNOR TO EMERSON-BRANTINGHAM COMPANY, OF ROCKFORD, ILLINOIS, A CORPORATION OF ILLINOIS.

POWER LIFT FOR GRAIN DRILLS.

Application filed December 8, 1920. Serial No. 429,208.

*To all whom it may concern:*

Be it known that I, CALVIN R. DAVIS, a citizen of the United States, residing at Rockford, in the county of Winnebago and State of Illinois, have invented certain new and useful Improvements in Power Lifts for Grain Drills, of which the following is a specification.

This invention has reference to power lift devices adapted for farming implements, and especially for grain drills.

In the operation of grain drills, it is desirable and necessary to vary the depth of drilling or planting according to the condition and nature of the soil and to the kind of seed being planted, and it is further desired to raise the seed delivery and furrow opening devices after planting to such elevation as will be safe for transportation. Power lift devices heretofore in use, while being provided with the desired means for adjusting the depth of planting have been objectionable in that the height to which the furrow opening devices are raised is directly proportional to the depth of adjustment. That is, when set for shallow planting the drilling devices are elevated sufficiently, but when set for deep planting the elevation of the devices above the ground will not be sufficient to clear ordinary obstructions. As the result, the disks or furrow opening devices are frequently damaged by striking stones and other ordinary obstructions while being transported. This objection I have aimed to overcome in the present invention by the provision of a novel power lift mechanism, which will raise the furrow opening devices to a given elevation at all times irrespective of depth adjustment. This insures against damage and breakage, since the furrow opening device will when elevated for transportation always be carried at the maximum distance above the ground.

Another object is to provide a generally improved and simplified power lift device especially adapted for grain drills, although equally applicable to other farm implements of similar requirements.

My invention also contemplates the provision of a power lift device of the character described which shall be simple and easy to adjust as to depth of planting and to operate for raising and lowering, and which shall be so constructed as to be capable of economical production.

Other objects and attendant advantages will be appreciated by those skilled in this art as the invention becomes better understood by reference to the following description when considered in connection with the accompanying drawings, in which—

Figure 1 is a fragmentary sectional view through a grain drill equipped with power lift mechanism embodying my invention;

Fig. 2, a top view of the power lift mechanism shown in Fig. 1;

Fig. 3, a sectional view taken substantially on the line 3—3 of Fig. 2, showing the position of the parts with the disk furrow opener raised;

Fig. 4, a similar sectional view with the disk furrow opener (not shown) in lowered working position;

Fig. 5, an enlarged detail sectional view through the clutch taken on the line 5—5 of Fig. 2; and Fig. 6, a fragmentary sectional view showing the adjustment for shallow drilling.

My invention is especially applicable to the well known type of grain drills to which a gang of disk furrow openers or the equivalent are adapted to be raised and lowered by oscillating a rock shaft having independent connections with the respective furrow opening devices. Inasmuch as the general construction of these drills is well understood, I have illustrated only such parts as are necessary for an understanding of the present invention.

Machines of this type include, generally stated, a pair of carrying wheels represented by character 8, an axle 9 supported and driven by the wheels, a seed box 11 from which the seed is delivered through mechanism, not shown, to the seed delivery boot 12, which deposits the seed in a furrow formed by a disk 13. The seed delivery boot 12 and disk furrow opener are carried in associated relation by a suitable bracket 14 which is connected to a drag bar 15 in turn pivotally connected at its forward end to the frame (not shown). The seed delivery boot and disk furrow opener as a unit are adapted to swing vertically from a working position in which the disk penetrates the ground to an inoperative position above the ground. A series of these furrow opening devices is adapted to be raised and lowered by oscillation of a rock shaft 16, each device having independent connection with the shaft. A typical connection of this kind comprises a yoked arm 17 fixed to the rock shaft and carrying a trunnion collar 18 through which passes a rod 19 pivotally connected at its lower end to the bracket 14, an expansion spring 21 being interposed between the collar 18 and a pin 22 on the rod 19 and serving to constantly urge the disk downwardly. By rocking the shaft 16 in a clockwise direction, the disk device will be raised, and in the reverse direction it will be lowered into working position in which it will be held under tension of the spring 21 with capacity afforded by the spring 21 to rise over obstructions.

The present invention has reference to a power-operated mechanism for oscillating the shaft 16 to raise and lower the disk devices. This mechanism comprises an eccentric 23 loose on the axle or shaft 9, a band 24 embracing the eccentric and fixed to a translating arm 25 which connects with the shaft 16 through the agency of an arm 26 fixed to said shaft and carrying a laterally projecting stud 27 disposed between abutment surfaces 28 and 29 on the arm 25. A clutch is now driven from the shaft 9 for transmitting half revolution movements to the eccentric 23. This clutch may be of any suitable or preferred construction and at present consists of a driving member 31 fixed to the shaft 9, and a driven member 32 loose on the shaft and connected by a bolt 33 to the eccentric 23. The part 32 as shown in Fig. 5, carries a pawl in the form of a roller-equipped bell crank lever 34, the roller 35 of which is constantly urged into engagement with the internal toothed face 36 of the driving member 31 by means of a contractile spring 37 operating through the bell crank lever 38 and link 39. The outer arms 41 and 42 of the bell cranks 34 and 39 are adapted to be actuated by a lever 43 for controlling the position of the pawl. The clutch control arm 43 equipped at its outer end with a roller 44 and pivotally mounted at 45 on the arm 26 near the shaft 16, is constantly urged in a counterclockwise direction by a contractile spring 46 to hold the roller 44 in contact with the peripheral cam surface 47 on the driven member 32. This roller is normally disposed in either of two sockets 51 or 52 so as to hold the clutch out of engagement. By pulling forwardly on a cable or rope 48 attached to a forward extension 49 of the lever 43, the latter will be swung in a clockwise direction to withdraw its roller 44 from the socket 51, thus freeing the lever 41 and engaging the clutch. The driven element of the clutch, together with the eccentric 23, will be revolved a half revolution and then automatically stopped by reason of the roller 44 dropping in the next succeeding socket 52 and throwing out the pawl. Upon again actuating the lever 43 the eccentric may be revolved another half revolution and then stopped. These successive movements of the eccentric are employed to raise and lower the disk devices as will be manifest.

I have aimed to insure that the disk devices shall be raised to a given elevation at each raising movement irrespective of the depth of planting. The depth adjustment is made by turning a screw 53 threadingly engaged in the outer end of the arm 25 and swivelingly connected to the block 54 on which the abutment 29 is formed. By this means the block 54 may be adjusted lengthwise on the arm 25 to change the effective length of said arm on the disk lowering action, or in other words, to modify the effect of the eccentric throw when the disk device is lowered. When the block 54 is moved to the extreme inner position shown in Figs. 1, 3 and 4, the full throw of the eccentric is imparted to the rock shaft 16, thereby lowering the disk furrow opener to the deepest penetration and lifting the disk to the highest elevation. When the block 54 is moved outwardly to any extent, as for instance to the position shown in Fig. 6, a corresponding amount of play is allowed between the eccentric arm 25 and the part 27, resulting in diminishing the depth of planting. In order to conveniently and accurately regulate the depth of planting the arm 25 is provided with a number of serrations 55 with which an indicator 56 on the block 54 co-operates for indicating the depth as determined by the position of the block. It will be noted that inasmuch as the elevation abutment 28 is permanently located with respect to the eccentric, the disk will be elevated to the same position at each raising operation irrespective of the position of the depth abutment. It follows that it is only necessary for the operator to adjust the screw 53 to regulate the depth of planting and that irrespective of such regulation, the disk devices will always be raised to the maximum elevation so as to be safe for transportation. It will be manifest from the foregoing that the raising and lowering operations are effected simply by pulling successively on the rope 48 to actuate the clutch mechanism, the operation in other respects being entirely automatic.

It is believed that the foregoing conveys a clear understanding of the objects prefaced above, and while I have illustrated and described but a single working embodiment, it should be manifest that various changes might be made in details of construction without departing from the spirit and scope of the invention as expressed in the appended claims:

I claim.

1. In a machine of the character described, the combination of a ground-breaking device, a rock shaft connected with said device, power-operated means for rocking said shaft to raise and lower said device, including an eccentric, an eccentric band, an arm fixed to said band and carrying a fixed abutment and an adjustable abutment, and an arm fixed to said rock shaft and having a part disposed between and adapted to be operated by said abutments, said adjustable abutment adapted for determining the working depth of said device and said fixed abutment for lifting the device to a uniform height at each raising operation.

2. In a machine of the character described, the combination of a ground-breaking device, a rock shaft connected with said device, power-operated means for rocking said shaft to raise and lower said device, including an eccentric, an eccentric band, an arm fixed to said band, a fixed and a movable abutment on said arm, a screw for adjusting said movable abutment on the arm toward and from the fixed abutment, and means fixed to said rock shaft and disposed between said abutments, whereby to be operated by the throw of said eccentric to raise and lower said device, the adjustable abutment determining the working depth of said device and the fixed abutment for lifting the device to a uniform height at each raising operation.

3. In a machine of the character described, the combination of a ground-breaking device and power-operated mechanism for raising and lowering said device comprising an eccentric, a follower adapted to be moving back and forth by rotative movement of the eccentric, a fixed abutment and an adjustable abutment on said follower, and means disposed between said abutments and connected with said device, whereby said means will be operated by the adjustable abutment for moving said device to working depth and will be operated by the fixed abutment for lifting the device to a uniform height at each raising operation.

4. In a machine of the character described, the combination of a drive shaft, a rock shaft, a translating part operated by the drive shaft for movement back and forth, an elevation abutment fixed to said part, a depth abutment adjustable on said part toward and from said elevation abutment, and means adapted to be actuated by said abutments for moving said rock shaft to different positions.

5. In a machine of the character described, the combination of a drive shaft, a rock shaft, a translating part adapted to be moved back and forth by rotation of the drive shaft, opposed abutments on said translating part, one of which is adjustable with respect to the other, and means connected to said rock shaft and disposed between said abutments, whereby to be operated by motion derived from said translating part for moving the rock shaft to different positions.

6. In a machine of the character described, the combination of a drive shaft, a rock shaft, an eccentric on the drive shaft adapted to be moved by said shaft about its axis, a translating part adapted to be moved back and forth by said eccentric, a part connected to said rock shaft, and means operable between said translating part and said rock shaft part for rocking the shaft a fixed degree upon movement of said translating part in one direction, and a variable degree upon movement in the opposite direction.

7. In a machine of the character described, the combination of a drive shaft, a rock shaft, an eccentric fixed to the drive shaft, an eccentric band having a translating arm projecting therefrom, an elevation abutment fixed to said translating arm, a depth abutment adjustable on said translating arm toward and from said depth abutment, an arm fixed to the rock shaft and disposed at its outer end between said abutments, and means operated by the drive shaft for transmitting half-revolution movements to the eccentric.

8. In a machine of the character described, the combination of a drive shaft, a rock shaft, an eccentric loose on the drive shaft, an eccentric band, a part adapted to be moved back and forth by said eccentric band, an elevation abutment fixed to said part, a depth abutment adjustable on said part toward and from said elevation abutment, means connected to said rock shaft and disposed between said abutments for determining movement of said rock shaft, and means driven by the drive shaft for imparting rotative movement to the eccentric.

9. In a machine of the character described, the combination of a drive shaft, a rock shaft, an eccentric loose on the drive shaft, a translating part adapted to be moved back and forth by said eccentric and carrying a fixed elevation abutment and an opposed adjustable depth abutment, means disposed between said abutments and connected with the rock shaft for rocking the latter by movement of said eccentric, and means operated by said drive shaft for transmitting rotative movement to said eccentric.

10. In a machine of the character described, the combination of a drive shaft, a rock shaft, an eccentric loose on the drive shaft, a part adapted to be moved back and forth by said eccentric and carrying a fixed elevation abutment and an adjustable depth abutment, a screw member threadingly engaged with said part for adjusting said depth abutment toward and from said elevation abutment, means disposed between said abutments and connected with the rock shaft for rocking the latter by movement derived from said eccentric, and means actuated by the drive shaft for imparting rotative movement to said eccentric.

11. In an implement of the character described, the combination of a drive shaft, a rock shaft, an eccentric loose on the drive shaft, an eccentric band having a rigid translating arm extending therefrom, opposed abutments on the outer end of said arm, one of said abutments being adjustable outwardly and inwardly on said arm, a part fixed to the rock shaft having a lateral projection disposed between said abutments and adapted to be operated by throw of the eccentric, a clutch on the drive shaft adapted for intermittently connecting the eccentric thereto, and a clutch control lever pivotally mounted on said part.

CALVIN R. DAVIS.